April 2, 1957 J. L. BAUER 2,787,438
SLIDE VALVE STRUCTURE
Filed March 29, 1954 3 Sheets-Sheet 1

JACOB L. BAUER INVENTOR
BY *George J. Silhavy* ATTORNEY

JACOB L. BAUER INVENTOR
BY George J Silhay ATTORNEY

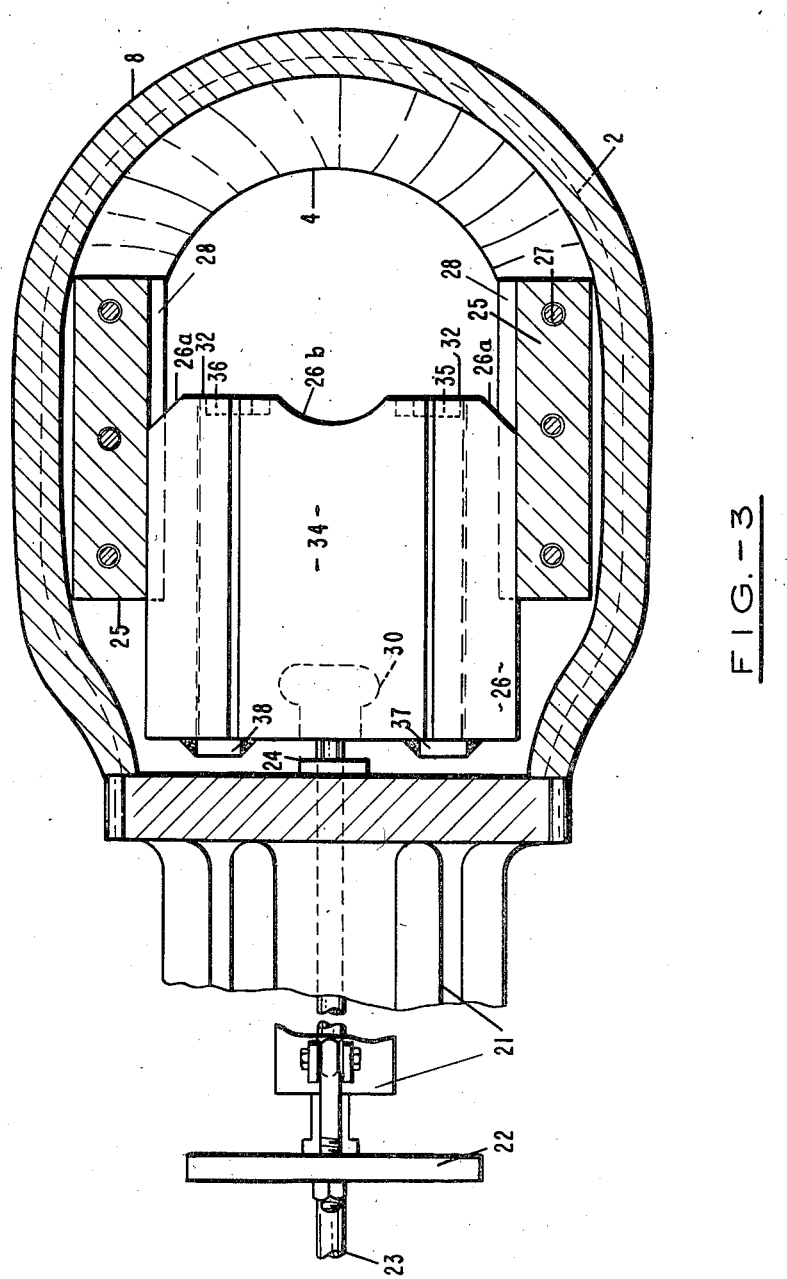

United States Patent Office 2,787,438
Patented Apr. 2, 1957

2,787,438

SLIDE VALVE STRUCTURE

Jacob L. Bauer, Mountainside, N. J., assignor to Esso Research and Engineering Company, a corporation of Delaware Application March 29, 1954, Serial No. 419,458

1 Claim. (Cl. 251—326)

The present invention relates to slide valves and particularly to slide valves of the type employed for controlling the flow of finely divided solid materials suspended in, or fluidized by, a stream of gaseous materials. The invention is especially concerned with a slide valve structure in which the surfaces of the slide valve element and the inlet of the valve structure are provided against the erosive action of the finely divided solid materials in the stream of such materials which passes into contact with such surfaces.

In the petroleum industry, and particularly in the catalytic cracking of hydrocarbons when employing the "fluidized solids technique," it is necessary to handle large quantities of finely divided solid catalyst materials having an individual particle size ranging from 0 to about 200 microns. These finely divided solid materials are usually handled as a suspension in air or another vaporous material, wherein the suspension behaves as a liquid. In such service, slide valves customarily have been employed to control the flow of the fluidized solids through the conduits provided for fluidized solids transfer in an operating system.

As thus employed, the valve element is generally arranged to be moved transversely of a valve inlet orifice, regulating flow by restriction of the orifice. In such a valve structure, the orifice, and the surrounding surfaces of the inlet passage, as well as the upstream surface and the leading edge of the valve element, are all critically subject to impact of the moving solid particles. The impingement of particles against such surfaces is of such force and frequency as to cause rapid erosion thereof, and consequent early deterioration of the parts involved. Rapid wear of the valve element and the orifice unduly shortens the on-stream time for the process operation, thus increasing costs and decreasing effectiveness.

The problem of erosion as outlined above is not restricted to the handling of fluidized cracking catalysts, but is common in all operations where analogous solid materials are caused to flow through and over control valve surfaces. Such materials may include pulverized and granulated coal, coke, ores, and other granular and finely divided solid materials.

The problem has been approached in many ways, including the use of liners and liner inserts of various forms and compositions. Such approach to the problem, however, has usually produced other problems of structure and operation of equal magnitude. For example, it has been proposed that valves be lined or provided with liner inserts of abrasion resistant materials, and also that the slide closure element in such valve structures be formed of abrasion resistant materials. This solution for the problem, however, has resulted in a problem occasioned by the fact that abrasion resistant materials, while hard, are usually brittle and have a comparatively low tensile strength. As a result of these characteristics, valve liners and slide valve plate members tend to be extremely fragile and subject not only to damage during manufacture, transportation and storage, as well as during assembly or disassembly of the valve structure, but also to damage in use as a result of vibration, temperature and other operational shocks. Extreme difficulty is also experienced where such brittle materials are required to be formed in complicated casting shapes due to casting strains and cracks, and also to the fact that shapes of such materials can usually be finished only by grinding.

It is an object of this invention to provide a slide valve liner and slide construction which will permit the employment of materials which, while highly resistant to abrasion, are normally unsuitable for such use because of their brittleness and low tensile strength. It is a further object of the invention to provide a slide valve liner and slide valve construction in which the abrasion resistant materials are employed in such fashion as to avoid excessive failures in the production of the liner materials and in the assembly of the finished units to be employed. This, according to the invention, is accomplished by providing for the employment of the brittle abrasion resistant materials in simple geometric shapes of substantially uniform cross-section, requiring a minimum of processing to adapt such materials to the service for which intended. It is also an object of this invention to provide a slide valve liner and slide construction in which abrasion resistant materials such as metals having a Brinell hardness of above 450 may be used, as well as ceramics and other fused or partially fused materials, including glass or glass-like materials. A particular material of the character contemplated for use according to this invention is Duraloy H, which is an alloy metal composed essentially of 2.75% carbon, 27 to 30% chromium, and the balance iron. Duraloy H has a Brinell hardness rating of from about 450 to about 500, and a tensile strength of 60,000 p. s. i.

The invention and its objects may be more fully understood from the following specification, when it is read in conjunction with the accompanying drawings, in which:

Fig. 3 is a horizontal section through the valve as shown in Fig. 1, taken along the line III—III thereof.

Figure 1:
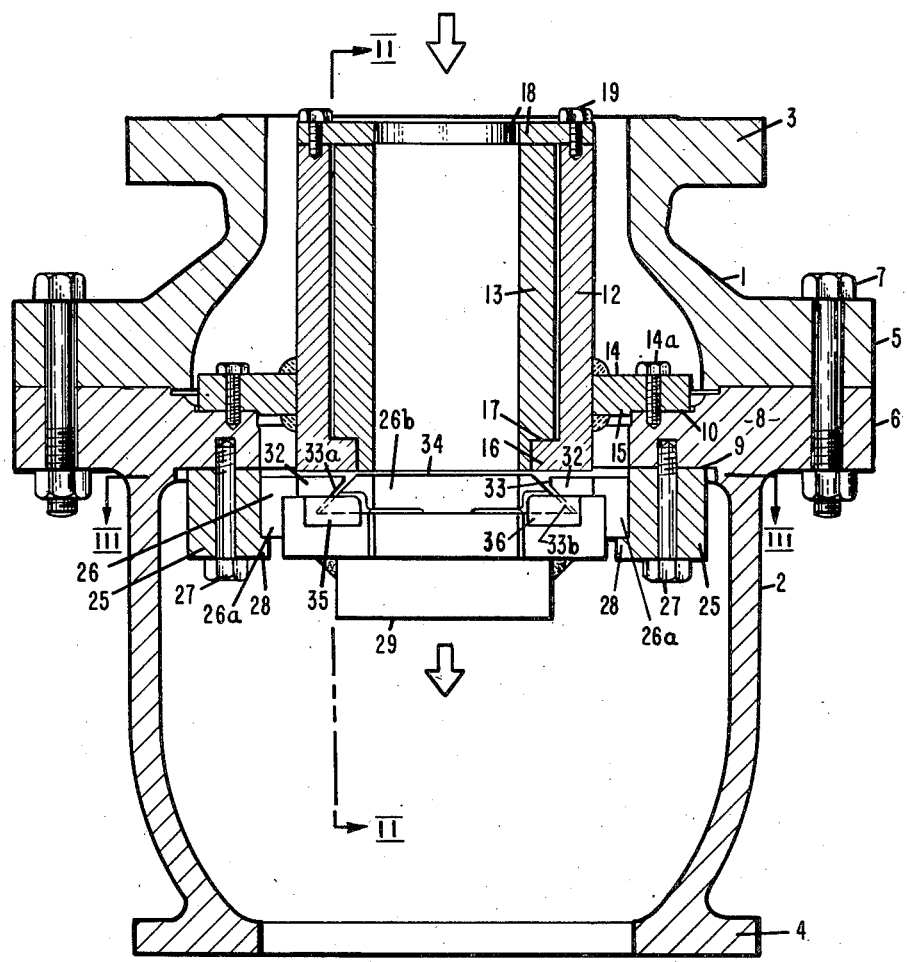
Fig. 1 is a vertical section through valve constructed in accordance with the present invention, with parts broken away.

In the drawings, like parts are designated by the same numerals in each figure, wherein the numerals 1 and 2 designate the inlet and outlet portions respectively of a valve body, each of which is provided with flange parts 3 and 4 respectively for connection to the opposed ends of adjoining, opposed conduit sections, not shown. The respective valve portions are also flanged as indicated by the numerals 5 and 6, and joined thereby as with bolts 7, to form a valve body unit assembly.

Figure 2:
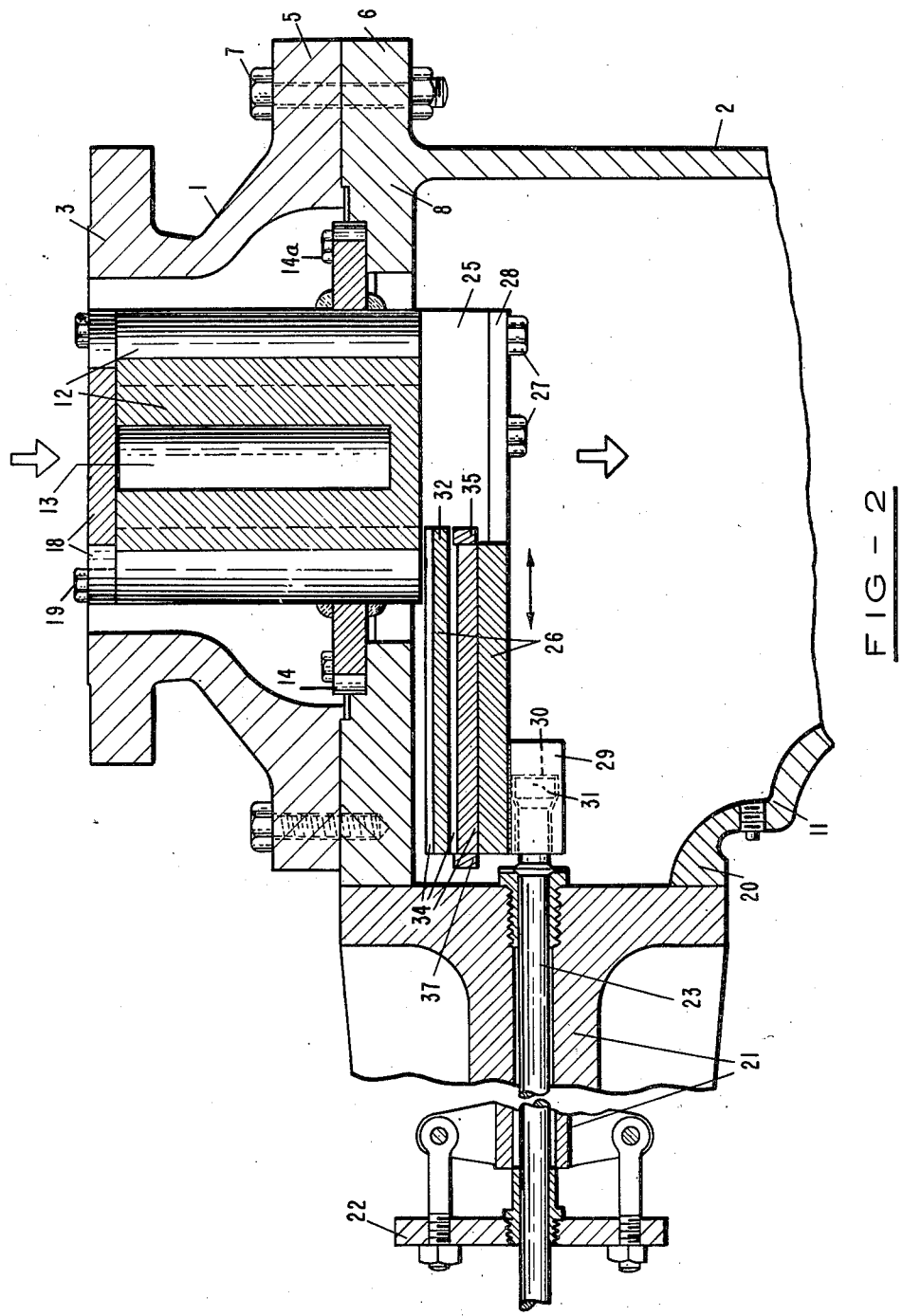
Fig. 2 is a similar section taken along the line II—II of Fig. 1, and in a direction 90° from the view as shown therein.

The valve outlet portion 2 is provided with an internal annular shoulder 8, which has an inner face 9, and an outer face 10. This shoulder 8 is substantially continuous with the external flange 6, and defines an orifice passageway substantially concentric with the valve body. The valve outlet portion is also provided with laterally extended, chambered portion as shown in Figs. 2 and 3, and designated therein by the numeral 11, for a purpose later described. This chambered portion communicates with the interior of the outlet portion 2, and is disposed below the flange 6 thereof, opening into the valve portion 2 below the shoulder 8.

A liner for the inlet portion of the valve is provided by means of an outer liner element 12 and an inner liner element 13. Preferably these inner and outer liner elements are cylindrical and disposed in concentric coextensive relationship one to another in the manner illustrated. As shown, the outer element 12 is provided with an external, annular flange 14 extending radially outward from the element 12 intermediate the ends thereof into surface supported contact with the outer face 10 of shoulder 8. The flange 14 is preferably disposed so that the inner end of the element 12 depends through the orifice provided by shoulder 8 so as to be substantially in a plane spaced below and in parallel relation to the face 9 of shoulder 8. Also as shown, the under surface of the annular flange 14 is provided with an annular, concentric boss 15, having an outer diameter substantially equal to the inner diameter of the annular shoulder, and adapted to center the liner element 12 within the central opening or orifice of the shoulder 8. The flange 14 may be secured to shoulder 8 by cap bolts 14a as shown.

The inner liner element 13 is telescopically associated with the outer element 12 and is supported in such relationship by the outer element as by means of the internal annular shoulder 16 at the inner end of element 12. As shown, the inner end of the element 13 is rabbeted to such depth radially and longitudinally as to provide an annular shoulder portion 17 adapted to engage the shoulder 16 so as to be supported thereby, with the inner end edge of element 13 substantially in the same plane as the outer surface of the portion 17 and the inner end edge of the element 12. The liner element 13 is shown to be retained in its relationship to the element 12 by means of an annular retainer ring 18 of a width substantially equal to the combined thickness of the two elements 12 and 13. The ring 18 may be secured to the liner element 12 by welding along the peripheral edges, or as shown by means of cap bolts 19.

The chambered portion 11 extending radially outward from the valve outlet portion 2 opens outwardly through a flanged end 20 which is adapted to receive a valve bonnet 21, including a packing gland assembly 22. A valve stem 23 extends through the bonnet 21 into the chambered portion 11 and valve outlet portion 2, and is reciprocally movable transversely of the outlet portion; annular flange 8 and liner elements 12 and 13. The stem as shown is supported in the bonnet by the packing gland assembly 22 and by a packing collar 24 threaded into the inner end of the bonnet 21.

Extending from within the chambered portion 11, into the valve outlet portion 2, and in opposed parallel spaced relation to each other are a pair of support guides 25 for a slide valve plate 26. The guides are mounted on the under surface of the annular shoulder 8 as by means of stud bolts 27, in substantially tangential relation to the inner edge portion of the shoulder with the bases or lips 28 of the guides extended toward each other beyond said edge, and chordially related to the circumference thereof. The valve plate 26, as more clearly shown in Fig. 3, is a rectangular member wherein the long sides are parallel to each other and to the guides 25. The outer end is provided with means for engagement by the valve stem 23, which means, as shown, is a block 29 secured as by welding to the under surface of the plate and provided with a shaped, hollow, chambered portion 30 adapted to receive an annularly flanged end piece 31 on valve stem 23. Other means of connection may be employed as desired. The inner end of the plate 26 is shown as chamfered at 26a and the flow intercepting edge of the plate may be provided with an arcuate indentation or cutout portion 26b centered in the plate and having a radius substantially corresponding to the radius of the liner element 13. The face of the inner edge of the plate is also rabbeted at each side, from the ends of the arcuate indentation 26b to an intersection with the chamfered edges 26a, which provides an overhanging lip portion 32 at either side of the arcuate indentation, each lip portion 32 having an upper surface continuous with the upper surface of the plate 26.

The upper surface of the plate 26 is in closely spaced relation to the lower ends of the liner elements 12 and 13, and is provided with a recess 33 which is longitudinally coextensive with the plate, and extends laterally an equal distance on either side of the longitudinal axis of the plate, the width of the recess at the plate surface being greater than the internal diameter of the inner liner element 13. The longitudinal edge portions of the recess, as shown in Fig. 1, and by dotted lines in Fig. 3, are rabbeted angularly to form equi-angular undercut portions 33a and 33b, so that in cross section the recess has the general form of a regular trapezoid.

The recess 33, thus formed, is provided to receive a valve plate insert, also of a hard, abrasion resistant material, such as the Duraloy metal previously referred to, and designated by the numeral 34. The insert 34 is of lateral and longitudinal dimensions substantially equal to those of the recess 33 as necessary to provide for a sliding, telescopic fit therein. In cross-section, the insert 34 also has the general conformation of a regular trapezoid, the edges each being chamfered at the same angle which is substantially equal to that of the angular recess portions 33a and 33b. The thickness of the insert 34 is slightly greater than the depth of the recess so as to provide a sliding surface contact between the upper insert surface and the lower end edge of the inner liner element 13, the lateral dimension of the upper insert surface being substantially equal to the outer diameter of the inner end edge of the inner liner element 13 as exposed within the outer element 12. As shown in the drawings, the insert 34 is retained against longitudinal motion as by means of blocks or stops 35, 36, 37 and 38. These blocks may be secured to the end edges of the plate 26 so as to overlap the ends of the recess 33 in any suitable manner. As shown the blocks are welded in place. To accommodate the projecting end edges of blocks 35 and 37, the inner end edge of the insert 33 is rabbeted at each side to provide a suitable recess for such purpose.

In assembling the valve, the slide plate 33 is mounted on the valve stem end 31, and inserted through the chambered portion 20 to seat upon the guides 25, and the bonnet 21 is secured to the flanged end of the chambered portion 11, as by means of bolts as shown. With the inlet portion 1 removed, the liner assembly including the elements 12 and 13, and the flange 14 is seated on the shoulder 8 and bolted thereto by means of the cap bolts shown. The inlet portion is then mounted on outlet portion 2 and secured by means of bolts 7. In use, the valve structure is secured between and in communication with the opposed ends of two adjoining conduit sections, the valve slide 26 being operable by means of the stem 23 to regulate the size of the orifice provided by liner element 13, and thus to control flow through the liner assembly and the valve in the conventional manner. In such operation the liner element 13 and the insert 34 present their hard, abrasion resistant surfaces to the impact and abrasive contact of the solid particles, contained in a fluidized stream thereof, passed through the valve as indicated by directional arrows applied in Figs. 1 and 2. It is a feature of the apparatus, as illustrated and described, that should the inner liner insert 13 and/or the plate insert 34 be destroyed or damaged, the relationships between the outer liner 12 and the valve plate 26 are such as to provide flow control during the time required to deactivate the system, in which the valve may be employed, so that repairs may be made.

What is claimed is:

A slide valve structure, comprising a valve body which includes an inlet portion and an outlet portion joined in end to end coaxial relation, an annular shoulder substantially integral with said outlet portion at the juncture thereof with said inlet portion, said shoulder extending radially inward to define a passageway between said portions, and having oppositely facing upstream and downstream surfaces in the direction of the valve inlet and outlet portions respectively, and orifice and liner assembly for said valve inlet portion including an outer tubular liner element of a rigid malleable material having a downstream end and an upstream end, an annular flange at the downstream end of said outer liner element extending radially inwardly thereof, an inner tubular liner element of a hard, abrasion resistant material having a downstream end and an upstream end, a rabbeted portion peripherally of the downstream end of said inner liner element which defines a recessed shoulder having a radial depth substantially equal to the width of said inwardly extending annular flange on said outer liner element and a longitudinal dimension substantially equal to the thickness of said flange, said inner liner element telescopically disposed within said outer liner element concentric therewith and supported in substantially coextensive relation thereto by engagement between said inner liner element shoulder and said outer liner element flange, a retainer ring mounted on the upstream end of said outer liner element and extending radially inward therefrom into surface alignment at its inner periphery with the inner wall surface of said inner liner element, an annular flange on said outer liner element extending radially outward from the outer periphery thereof and longitudinally spaced from the downstream end thereof by a dimension slightly greater than the thickness of said annular shoulder on said valve outlet portion, whereby the downstream end of said orifice and liner assembly is extended into said valve outlet portion in substantially parallel spaced relation to the downstream surface of said outlet portion shoulder, and a slide valve assembly within said valve outlet portion which includes a slide valve plate of a rigid malleable material supported in said outlet portion for reciprocal movement transversely thereof, centered diametrically of said orifice and liner assembly in the direction of movement of said plate and having a lateral dimension at least equal to the inner diameter of said outlet portion shoulder, said plate having an upstream surface portion disposed in substantially parallel, closely spaced relation to the downstream end of said liner assembly, and a leading and trailing edge, a recess defined in the upstream surface of said plate extending longitudinally through the leading edge thereof and having a lateral dimension at the surface of said plate substantially greater than the internal diameter of said inner liner element, and a surface insert for said slide plate of a hard, abrasion resistant material disposed in said plate recess and substantially coextensive therewith, said insert having a thickness substantially greater than the depth of said recess and an upstream surface adapted to engage the downstream end of said inner liner element for sliding surface contact therewith, said plate and insert adapted to vary the area of said orifice provided by the liner assembly by reciprocal movement of said slide assembly while exposing only said inner liner element and said surface insert to direct surface contact by a flow stream passed through said valve.

References Cited in the file of this patent

UNITED STATES PATENTS

| | | |
|---|---|---|
| 467,955 | Richards | Feb. 2, 1892 |
| 1,672,124 | Haugh | June 5, 1928 |
| 2,301,355 | Armentrout | Nov. 10, 1942 |
| 2,454,160 | Greene | Feb. 5, 1952 |
| 2,584,161 | Scherer | Feb. 5, 1952 |
| 2,606,740 | Allen | Aug. 12, 1952 |